(12) United States Patent
O'Keefe et al.

(10) Patent No.: US 6,246,826 B1
(45) Date of Patent: Jun. 12, 2001

(54) VARIABLE OPTICAL ATTENUATOR WITH PROFILED BLADE

(75) Inventors: Sean Sebastian O'Keefe; Keith Douglas Anderson, both of Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/388,628

(22) Filed: Sep. 2, 1999

(51) Int. Cl.[7] ............................................. G02B 6/00
(52) U.S. Cl. .............................................. 385/140; 385/19
(58) Field of Search ........................ 385/140, 19, 23, 385/25; 359/388

(56) References Cited

U.S. PATENT DOCUMENTS

| | | | |
|---|---|---|---|
| 4,925,273 | * | 5/1990 | Maisenbacher et al. ............ 350/315 |
| 5,226,104 | * | 7/1993 | Unterleitner et al. ................ 385/140 |
| 5,325,459 | * | 6/1994 | Schmidt ................................ 385/140 |
| 5,745,634 | * | 4/1998 | Garrett et al. ........................ 385/140 |
| 5,900,983 | * | 5/1999 | Ford et al. ............................ 385/140 |
| 6,061,235 | * | 5/2000 | Cromwell et al. ................... 361/690 |

* cited by examiner

*Primary Examiner*—Cassandra Spyrou
*Assistant Examiner*—Euncha Cherry
(74) *Attorney, Agent, or Firm*—Victoria Donnelly

(57) ABSTRACT

The invention relates to a variable optical attenuator having a profiled blade. It includes a mounting base with an actuator formed on the base, the actuator carrying the blade which is moveable across a light beam. The blade is profiled so as to provide a predetermined attenuation of the beam as a function of the displacement of the blade, the function being preferably substantially linear. As a way of example, first and second embodiments of the invention describe an electrostatic comb attenuator made of a semiconductor material and forming a monolithic structure. The embodiments relate to different blade profiles, having a protrusion and a notch at the front edge of the blade respectively. The attenuator device additionally includes light input and output lenses for receiving and directing light along a predetermined optical path. Other known type of attenuators having profiled blades, e.g. thermal, electromagnetic, microgears and piezo-electric, may also be used in modifications to the preferred embodiments described above. If required, the attenuator may be integrated into a package.

49 Claims, 5 Drawing Sheets

VARIABLE OPTICAL ATTENUATOR WITH PROFILED BLADE

FIELD OF INVENTION

The invention relates to variable optical attenuators, and in particular, to variable optical attenuators having profiled blades.

BACKGROUND OF THE INVENTION

An optical attenuator is a device which is widely used in a variety of modern telecommunications applications. It provides balance of optical power levels of data transmission, including balancing of signal-to-noise ratio and power levelling between different wavelengths in a wavelength division multiplexing (WDM) system. Usually there is a large number of attenuators distributed throughout the system, the particular patterns dictated by the geometry of the network (long haul, ring, metro, etc.). Because of an increasing use of these elements, small, efficient and easily controllable attenuators become an important requirement.

There is a variety of types of optical attenuators developed up to date. As an example, they include waveguides with electronically variable properties, macroscopic mechanical means of attenuating light, and micro-mechanical structures brought by the rapid advances of the micro-electro-mechanical system (MEMs) technology during the past ten years. Material thicknesses and feature sizes of 1 micron and sub-micron dimensions are typical as a result of the use of high definition photolithography techniques, but having the ability to fabricate these structures is only the first step. The next is to provide an efficient use of such devices by an easy and controllable attenuation of light up to sub-dB range of accuracy.

SUMMARY OF THE INVENTION

It is therefore an object of the invention to provide a variable optical attenuator which would provide an easy and controllable attenuation of light.

According to one aspect of the invention there is provided a variable optical attenuator device, comprising:
  a light input means for receiving a light beam and directing said light beam along an optical path;
  an attenuator comprising an actuator carrying a blade whose front edge is moveable across said light beam to provide an attenuated light beam, the front edge of the blade being profiled so that the attenuation of the beam is a predetermined function of the displacement of the blade; and
  a light output means disposed along said optical path for receiving said attenuated light beam.

Conveniently, the device further comprises a mounting base, the base having a locating structure, e.g. trenches, grooves, slots, pins, edges, shelves, for receiving the light input and output means. Preferably, the front edge of the blade is profiled so that to partially block the beam and provide that the attenuation of the beam is substantially proportional to the displacement of the blade, desirably the attenuation being linear versus the displacement of the blade. For some applications it may be convenient to have the blade profiled so that the attenuation of the beam is logarithmic versus the displacement of the blade. First and second embodiments of the invention use a monolithic semiconductor electrostatic actuator carrying the profiled blade. The blade of the first embodiment has a triangular protrusion at its front edge, the size of the protrusion being of the order of several FWHM of the laser beam. Accordingly, the blade of the second embodiment has a triangular notch at its front edge, the notch having a size similar the above protrusion. It is understood that the blade may have any other shape, e.g. include a protrusion and/or a notch of rectangular, trapezoidal, square, oval, circular, semi-oval, semi-circular or any other required profile. The blade is made of a semiconductor opaque material and covered with a thin layer of metal. Alternatively, the blade may be made of a semi-transparent material, e.g. doped glass. It required, the device may be integrated into a package, either alone and/or with other opto-electronic components.

In modifications to the above embodiments the electrostatic actuator may be replaced with another known actuator capable of carrying and moving the blade to the required accuracy, e.g. electromagnetic actuator, thermal actuator, piezoelectric actuator, and micro-gears actuator. Light input and output means may include fiber, such as cleaved fiber, angle cleaved fiber, expanded core fiber and fiber bundle, or a lensed source, such as ball lens, index graded lens, fiber with a lens and tapered fiber. Conveniently, the input and output means are made symmetrical to each other. Optionally, the device may include a thermal management system for maintaining a constant temperature of the device. If required, the device may be integrated into an optical fiber transmission system. A set of VOA devices 10 may be arranged into one- or two-dimensional array according to a predetermined pattern, depending on the requirements of the system.

According to another aspect of the invention there is provided an optical attenuator comprising:
  a base; and
  an actuator formed thereon, the actuator carrying a blade whose front edge to be moved across a light beam to attenuate the light beam, the front edge of the blade being profiled so that the attenuation of the beam is a predetermined function of the displacement of the blade.

Optionally, the optical attenuator has a locating structure, e.g. trenches, grooves, slots, pins, edges, shelves, for receiving light input and light output means formed on the base. Preferably, the front edge of the blade is profiled so that the blade partially blocks the beam so that the attenuation of the beam is substantially proportional to the displacement of the blade, desirably being linear versus the displacement of the blade. For some applications it may be convenient to have the blade profiled so that the attenuation of the beam is logarithmic versus the displacement of the blade. Similar to the above, the blade may have any other shape, e.g. include a protrusion and/or a notch of a triangular, rectangular, trapezoidal, square, oval, circular, semi-oval, semi-circular or any other required profile. Preferably, the typical size of the protrusion and/or the notch is of the order of several full width half maximum (FWHM) of the laser beam. The blade may be made of an opaque material, e.g. semiconductor material, or semi-transparent material, e.g. doped glass. If required, the attenuator may be integrated into a package, either alone and/or with other opto-electronic components. Other types of actuators are also suitable to be implemented into the attenuator of the present invention. They include electromagnetic actuator, thermal actuator, piezoelectric actuator, micro-gears actuator or any other known actuator capable of carrying and moving the blade to the required accuracy. If required, attenuators may be arranged into one- or two-dimensional array.

According to yet another aspect of the invention there is provided an actuator for a variable optical attenuator, the actuator carrying a blade whose front edge to be moved across a light beam to attenuate the beam, the actuator being characterized in that the front edge of the blade is profiled so that the attenuation of the beam is a predetermined function of the displacement of the blade. Preferably, the blade is profiled so that the attenuation of the beam is substantially proportional to the displacement of the blade.

The use of the optical actuator with the profiled blade in an optical attenuator provides the attenuation of light which can be controlled easily and accurately. By patterning the required profile of the blade, it is ensured that the attenuation is a predetermined function of the displacement of the blade. For most applications, it provides a big advantage, especially where a substantially linear response of the device is required.

BRIEF DESCRIPTION OF THE DRAWINGS

Embodiments of the invention will now be described, by way of example, with reference to the accompanying drawings in which:

FIG. 2b illustrates an operation of the electrostatic comb actuator of FIG. 2a;

DESCRIPTION OF THE PREFERRED EMBODIMENTS

Figure 1:
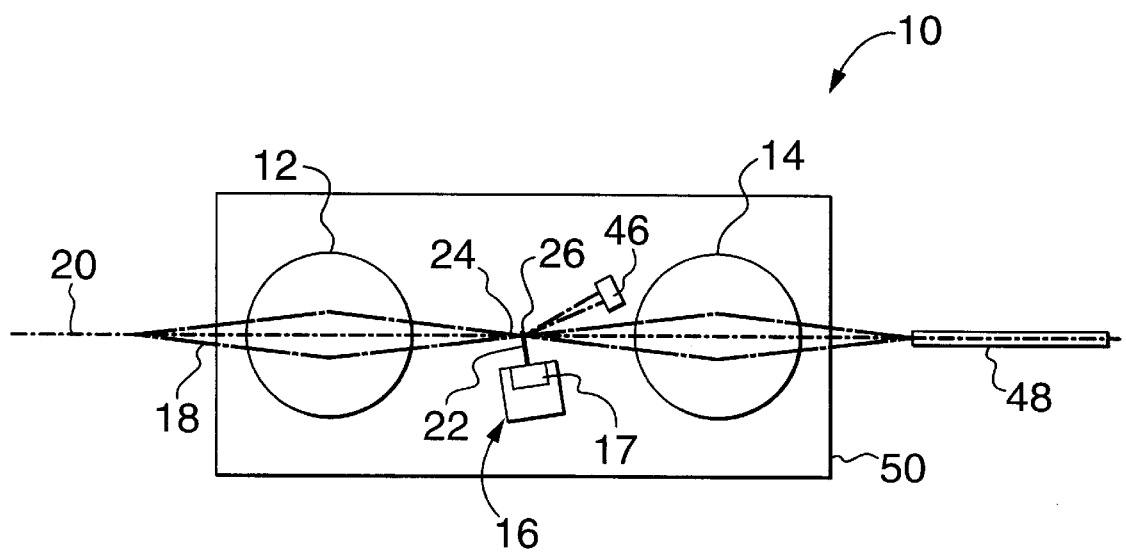
FIG. 1 is a schematic view of a variable optical attenuator VOA) device according to a first embodiment of the invention.

As shown in FIGS. 1 to 3, a variable optical attenuator device 10, according to the first embodiment of the invention, comprises a light input means represented by an input ball lens 12, a light output means represented by an output ball lens 14, and an optical attenuator 16 placed between the lenses 12 and 14.

The input lens 12 receives an incoming light beam 18 and directs it along an optical path 20 so as the light to be further received by the lens 14 disposed along the path 20. The attenuator 16 has an actuator 17 which carries a blade 22 to be moveable into the light beam 18, preferably across the beam waist 24 as shown in FIG. 1, to partially block the light and provide the attenuation of the beam 18. A front edge 26 of the blade 22 is profiled so as to selectively block portions of the beam as the blade moves, thus providing the attenuation of the beam as a predetermined function of the displacement of the blade as will be described in detail below.

Figure 2A:
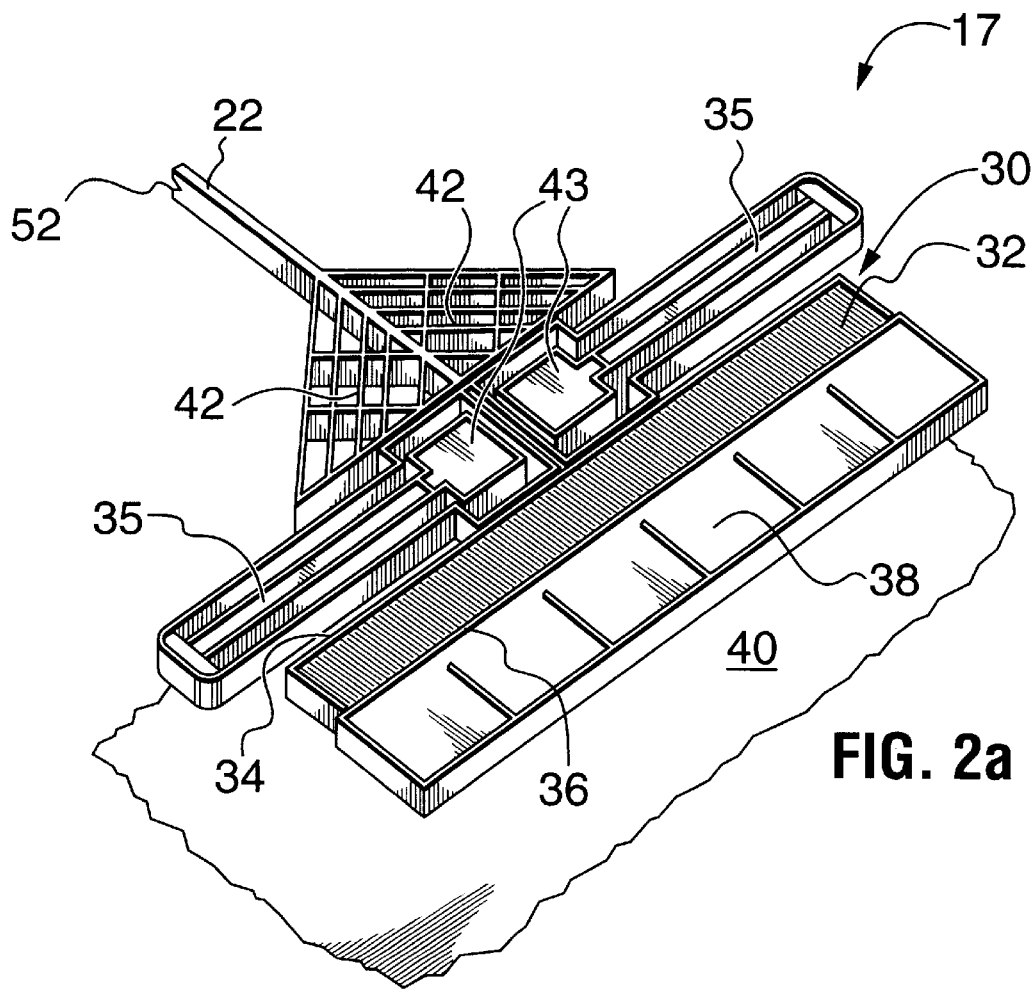
FIG. 2a is a scanning electronic micro-scope (SEM) photograph an electrostatic comb actuator. incorporated into the A device of FIG. 1.
Figure 2B:
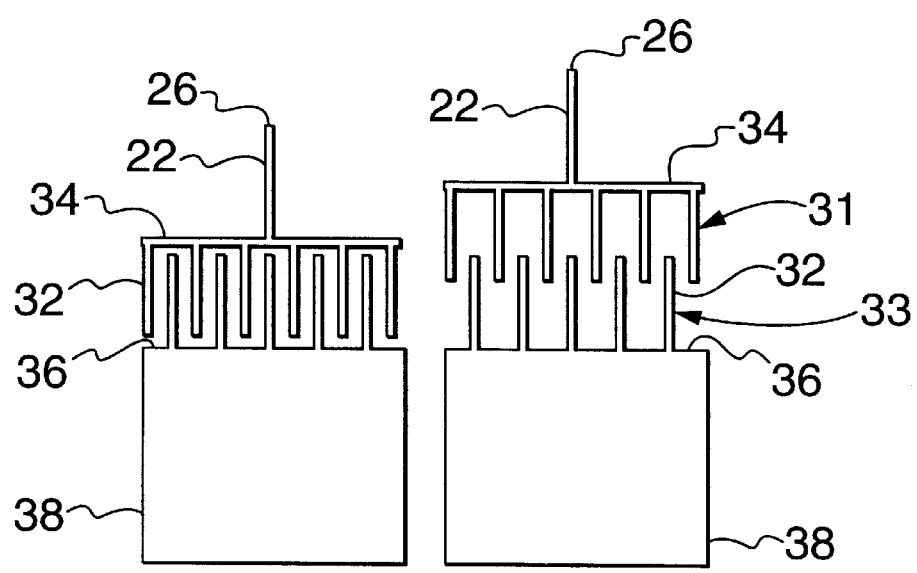

The structure of the attenuator 16 is illustrated in more detail in FIGS. 2a and 2b which show a SEM photograph of the actuator 17 incorporated into the VOA device of FIG. 1 and a schematic structure of the actuator 17 respectively. The actuator 17 is an electrostatic type actuator including a capacitor comb drive 30 which carries about 300 comb fingers 32 arranged into first and second arrays 31 and 33 respectively. The first array 31 includes odd fingers which are fixed to the movable upper plate 34 of the comb drive 30, while the second array 33 includes even fingers which are fixed to the lower plate 36 of the comb drive. It is conveniently arranged that the first and second, arrays of fingers interleave with each other. In turn, the lower plate 36 of the comb drive 30 is solidly fixed to an anchor to base 38, ensuring that the comb drive is attached to the base 40, and the plate 36 does not move. The upper plate 34 of the comb drive 30 carries the profiled blade 22 which is supported by two symmetrical stiffeners 42 on each side of the blade, ensuring that the blade does not bend and moves along a predetermined direction during its operation. A pair of two symmetrical suspension springs 35, each attached to corresponding anchors 44 for moving the blade and springs, are formed between the comb drive 30 and the blade stiffeners 42. Each anchor 44 is fixed to the upper plate 34 by one of its sides and to the stiffener 42 by its another side. Additional locating structure designed in the form of trenches for receiving input and output lenses 12 and 14 and transmittance fibers (not shown) is formed on the base 40. The power of the attenuated beam is measured by a photodetector 46, receiving a portion of the beam reflected from the blade 22, and the attenuated beam is further received by an optical fiber 48. The attenuator device 10, or optionally the attenuator 16 only, may be placed within a thermal management system 50 and packaged inside a package. Optionally, to avoid ringing of the blade and to increase damping, the package may be filled with oil. Additionally the oil acts as an index matching liquid and reduces the back reflection and the insertion loss.

Figure 3C:
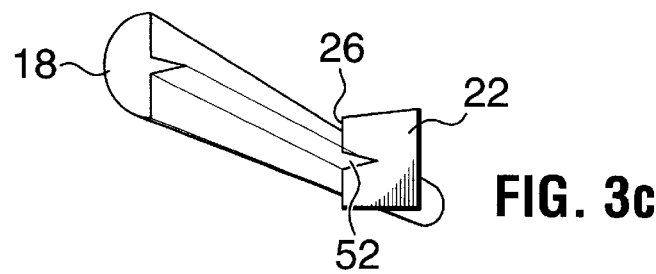
FIGS. 3a, 3b, 3c illustrate blades having different profiles and corresponding to the prior art and first and second embodiments of the invention.
Figure 3B:
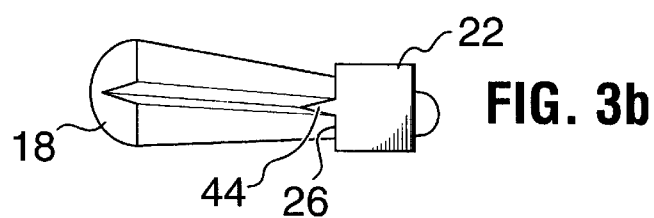
Figure 3A:
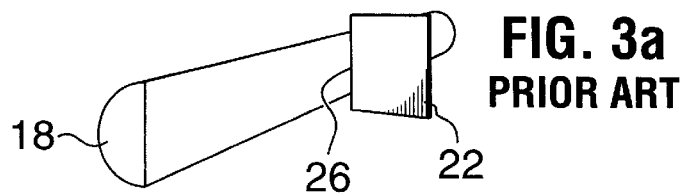
Figure 4:
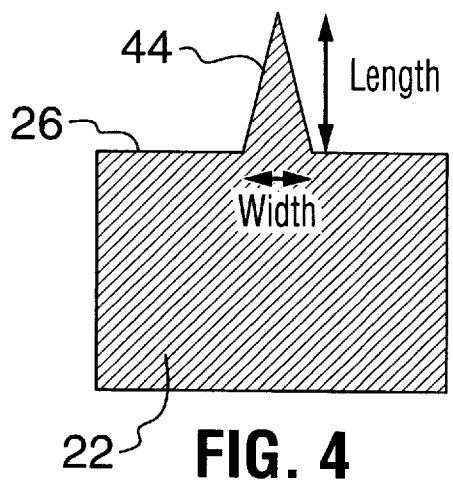
FIG. 4 illustrates the blade of FIG. 3b shown to a larger scale.

The blade 22 of the first embodiment has a profile shown in FIG. 3b which is patterned so as to provide a protrusion 44 at the front edge 26 of the blade. For comparison FIG. 3a illustrates a knife-edge blade according to the prior art. The protrusion 44 has the following size: the length of the protrusion 44 is about 20 microns which corresponds to about 2 FWHM of the laser beam 18, and the width of the notch is about 2 microns which is about 0.1 FWHM of the beam. Left hand side parts of FIGS. 3a and 3b illustrate portions of the light beam 18 which are unblocked by the blades of the prior art and the first embodiment respectively. Assuming that in most situations we deal with Gaussian beams, it means that the protrusion 44 will mostly block central highest intensity portions of the laser beam 18 as the blade 22 moves across the beam 18. The blade of FIG. 3b is shown to a larger scale in FIG. 4.

The VOA 16 is fabricated of silicon semiconductor material by deep reactive ion etching (DRIE) which allows the fabrication of the actuator 17, including the suspension structures 35 and the locating structure, in the same etching step together with the profiled blade 22. Thus the attenuator 16 is formed as a monolithic structure. The mobile structures are released by sacrificial layer etching, i.e., by the time stopped removal of a buried oxide of a Silicon-On-Insulator (SOI) wafer. The use of SOI wafers allows also to obtain a uniform etching depth, i.e., the plasma etching stops when the buried oxide is reached. The height of the etched structures is about 70 microns. To increase the reflectivity of the blade, the silicon is gold coated. This is done by e-beam evaporation where the wafers are oriented appropriately allowing the metal vapour to reach the vertical surfaces.

The typical size of the components of the device 10 are as follows: the size of the base is 1 cm×1 cm, the size of the actuator 17 is in the range of 100–400 microns, blade length is about 50–100 microns, blade width is 2–5 microns, length of the protrusion is about 10 to 40 microns, width of the protrusion is about 2 to 10 microns, the blades travel up to 30–60 microns, with 5–10 micron moves being typical, beam diameter at the beam waist is about 8–10 microns, the blade is moved into the beam at about 8° to the direction of the optical path 20, the lenses 12 and 14 are SELFOC graded index ball lenses of about 1.5 mm diameter, and the diameter of the fiber 48 is about 125 microns.

The VOA device 10 operates in the following manner. The energy stored in the capacitor comb drive 30 is given by ½CV² where C is the capacitance and V is the applied voltage. At a given voltage, there is a force proportional to the derivative of the energy as a function of capacitance curve. This force tends to move the system to a point in which more energy is stored in the capacitor. The first plate of the capacitor is the upper plate 34 of the comb drive 30 which is attached to the spring 32, and the second plate of the capacitor is the lower plate 36 of the comb drive which is fixed to the base 40. When the voltage is applied, the plates 34 and 36 tend to come together as shown in FIG. 2b in order to increase the capacitance of the system. Thus, there is a balance between the spring force of the spring 35 and the force generated by the stored energy in the capacitor, establishing an equilibrium. When the voltage is increased, the plates 34 and 36 move closer together to establish a new equilibrium. Accordingly, the blade 22 is moved in and out of the light beam 18 as the voltage changes. The required voltage can be up to 100V, with a typical range being within 50V. Because the actuator is based purely on capacitance, it has no continuous power dissipation. This is a definite advantage, because it does not add a thermal load. Since the moveable structure does not touch any other parts, no sticking of the moveable structure can occur. In addition, silicon is an excellent mechanical material which does not show any fatigue in absence of humid air.

Figure 5:
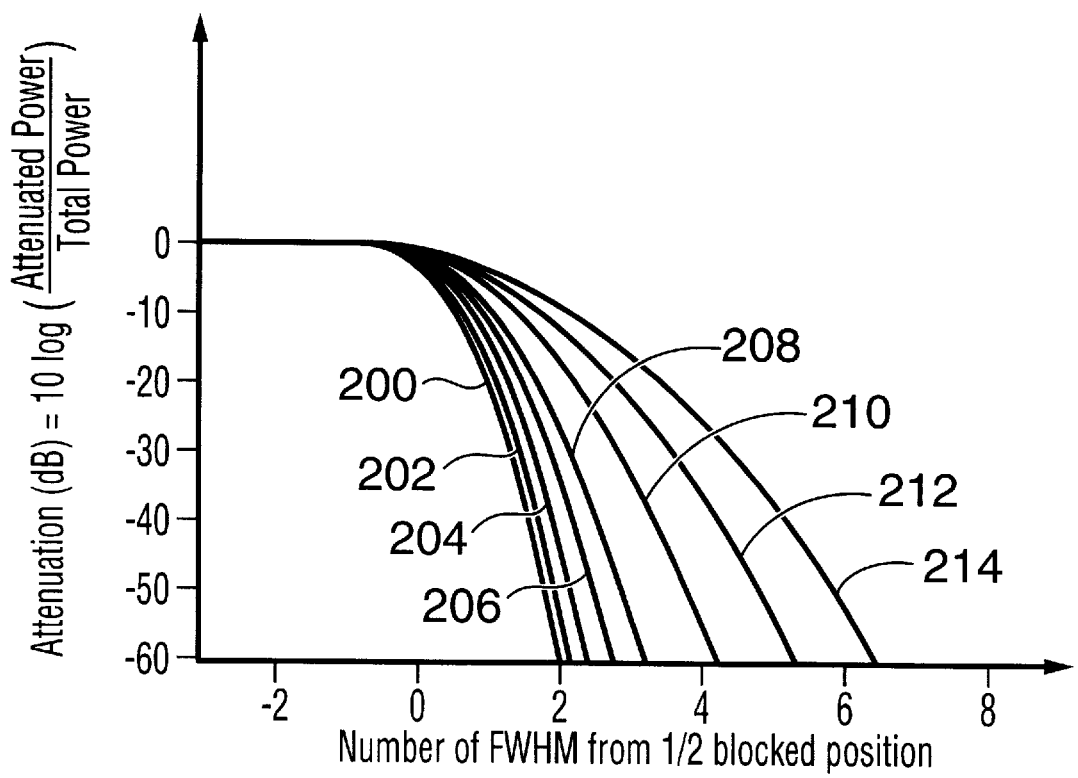
FIG. 5 shows a dependence of the attenuation of the beam as a function of the displacement of the blade for the blade of FIG. 4.

Being profiled according to a predetermined pattern, the blade 22 blocks required portions of the light beam 18 and provides the required attenuation function of the device 10. FIG. 5 illustrates the results of computer modelling of operation of the VOA device 10 having the blade of FIG. 4. It shows the attenuation of a Gaussian beam as a function of the displacement of the blade (logarithmic scale). In FIG. 5, zero reference point along the horizontal axis corresponds to a position of the knife edge blade blocking ½ of the geometric diameter of the beam, i.e. blocking 50% of the beam power as illustrated in FIG. 3a. Accordingly, the curve 200 in FIG. 5 refers to the knife edge blade of FIG. 3a, while the rest of the curves 202 to 214 refer to the blade of FIG. 4 having the protrusion. Curves 202, 204, 206, 208, 210, 212 and 214 correspond to protrusions having different widths, namely 1, 2, 4, 6, 8, 10 and 20 microns respectively which, in turn, correspond to widths equal to 0.1, 0.2, 0.4, 0.6 0.8, 1 and 2 FWHM of the laser beam. The length of the protrusions is fixed at 40 mmicrons (which is about 4 FWHM).

FIG. 5 shows that, for the blade profile having the protrusion, it is convenient to present the results in the logarithmic scale. Curves 200 to 214 demonstrate substantial flattening, with the curve 214 having the widest linear dynamic range of blade displacements. As follows from FIG. 5, for the knife edge blade, the dependence of the attenuated power versus displacement is quite steep (curve 200). It means that there is only a limited range of displacements of the blade corresponding to the required power range, and therefore the displacements have to be made with high accuracy. For the profiled blade of FIG. 4, as the width of the protrusion increases, curves 202 to 214 become less and less steep, with the curve 214 being the most flattened. It means that less steep dependence of the output power versus displacement of the blade provides wider dynamic range of operation of the device within similar power limits. It also provides more easy and accurate control of the attenuated power as the blade moves, and therefore less strict requirements to the mechanical parameters of the device.

Figure 6:
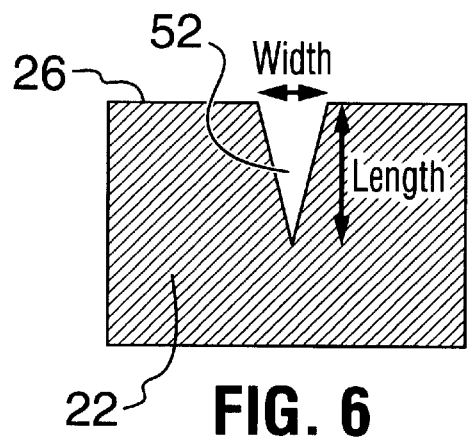
FIG. 6 illustrates the blade of FIG. 3c shown to a larger scale.
Figure 7:
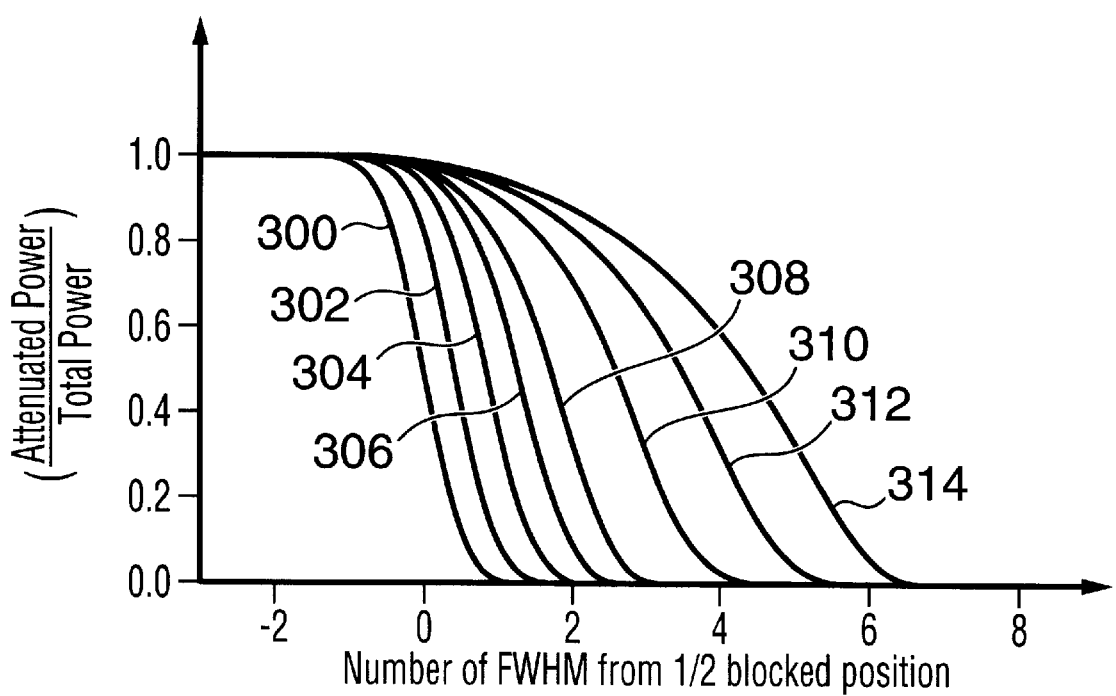
FIG. 7 shows a dependence of an output power of the beam as a function of the displacement of the blade for the blade of FIG. 6.

A VOA device according to the second embodiment of the invention is similar to that of the first embodiment described above except for the blade now having a notch 52 of a size similar to the protrusion 44 at its front edge as shown in FIG. 3c and FIG. 6 (to a larger scale). Accordingly, FIG. 7 illustrates the output power (linear scale) of the VOA device incorporating such a blade. The left most curve 300 refers to the knife edge blade, with the rest of the curves 302 to 314 corresponding to blades having triangular notches of FIG. 6 of different widths. Curves 302, 304, 306, 308, 310, 312 and 314 correspond to notches having widths of 1, 2, 4, 6, 8, 10 and 20 microns respectively which correspond to width equal to 0.1, 0.2, 0.4, 0.6 0.8, 1 and 2 FWHM of the laser beam. The length of the notches is fixed at 40 microns (which is about 4 FWHM). As follows from FIG. 7, the linear response of the device 10 flattens substantially as the width of the notch increases, thus providing less steep characteristics of the device and enhancing the linear dynamic range for blade displacements (curves 302 to 314).

Summarizing the above discussion, it has been shown that it is conveniently possible to provide less steep and more linear dependence of attenuation of the VOA versus displacement of the blade by using a profiled blade having a protrusion at its front edge. Alternatively, by using a blade having a notch at its front edge, it is possible to provide similar results for the dependence of the output power of the attenuator versus blade displacement.

Thus, it has been demonstrated that it is possible to control attenuation of the VOA device by varying profile of the blade, and to provide attenuation of the VOA as a required function of the blade displacement.

Figure 8:
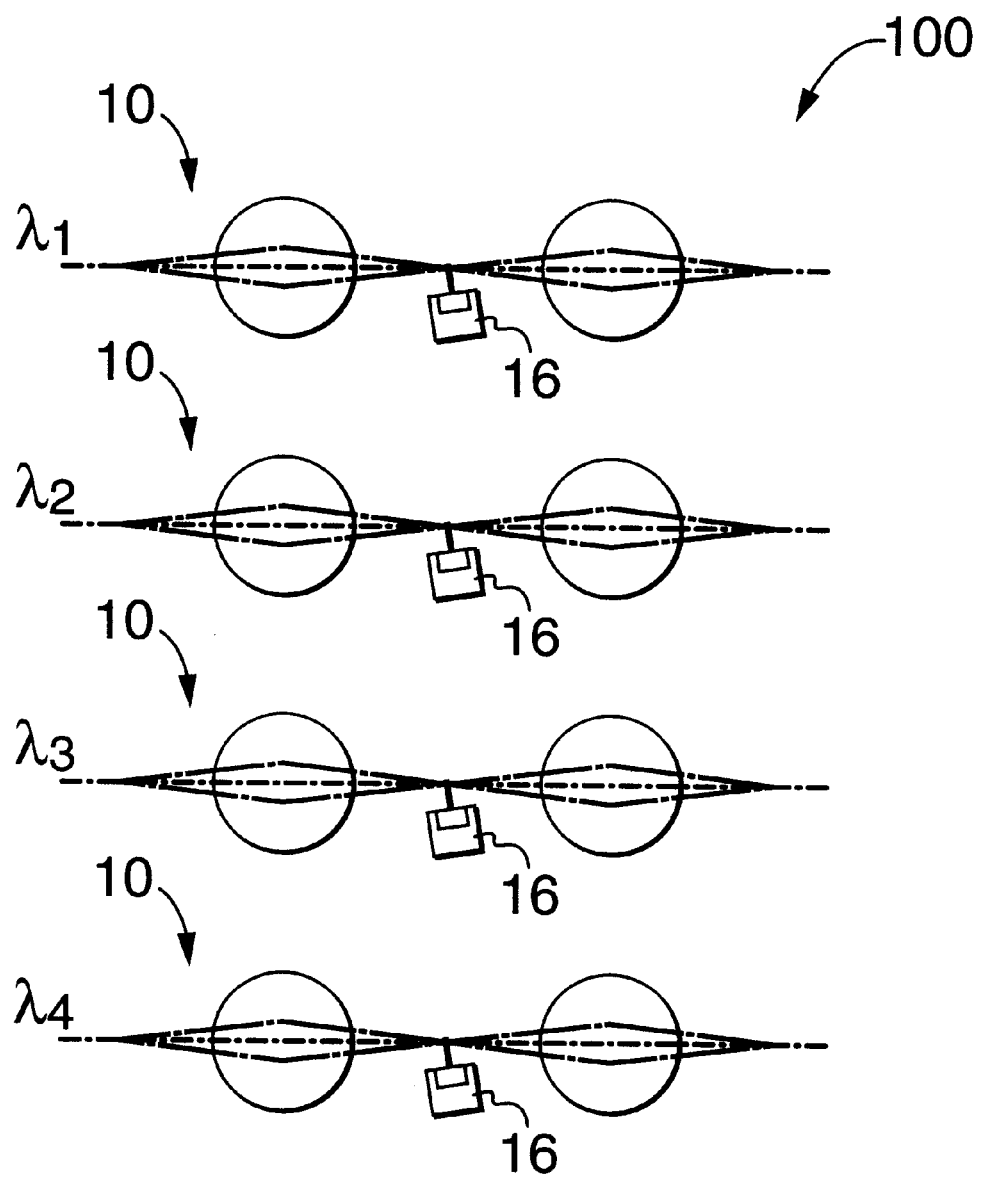
FIG. 8 illustrates a one-dimensional array of VOA devices of FIG. 1.

Numerous modifications can be made to the design of the VOA device 10 described above. The blade 22 may have any other profile providing required attenuation response of the VOA device. The blade may be made of an opaque material, e.g. semiconductor material, or semi-transparent material, e.g. doped glass. Instead of DRIE techniques described above, other known patterning techniques, e.g. photolithographic patterning, plasma etching, wet etching, material deposition techniques, may be used to pattern the blade and/or the whole VOA device. The attenuator device 10 may be packaged either as a stand-alone fiber-to-fiber VOA, as an output shutter on a transmitter module being placed between the laser and the output fiber, or as a power limiter in a receiver module. It is contemplated that other embodiments of the invention may comprise other known actuators, e.g. electromagnetic actuator, thermal actuator, piezoelectric actuator and frictional (micro-gears) actuator. If required, variable optical attenuators 16 or VOA devices 10 may be arranged into an array according to a predetermined pattern. For example, FIG. 8 illustrates a one-dimensional array 100 of four VOA devices 10 attenuating light generated at four different wavelengths. Depending on the system requirements, it is also possible to arrange VOA devices 10 into a matrix or any other two dimensional array having the necessary geometry.

The use of the optical actuator with the profiled blade in an optical attenuator provides the attenuation of light which can be controlled easily and accurately. By patterning the required profile of the blade, it is ensured that the attenuation is a predetermined function of the displacement of the blade. For most applications it provides a big advantage, especially where a substantially linear response of the device is required.

Although specific embodiments of the invention have been described in detail, it will be apparent to one skilled in the art that variations and modifications to the embodiments may be made within the scope of the following claims.

What is claimed is:

1. A variable optical attenuator device, comprising:
   a light input means for receiving a light beam and directing said light beam along an optical path;
   an attenuator comprising a base and an actuator formed thereon, the actuator carrying a blade whose front edge is movable across said light beam to provide an attenuated light beam, said blade including a pattern consisting one of three dimensional notch and protrusion selected such as to achieve a predetermined attenuation function by a resulting profile thereof; and
   a light output means disposed along said optical path for receiving said attenuated light beam.

2. A device of claim 1, wherein, the base has a locating structure for receiving the light input and output means.

3. A device of claim 2, wherein the locating structure comprises an element selected from the group consisting of a trench, groove, slot, pin, edge, shelf and a combination thereof.

4. A device of claim 1, wherein the front edge of the blade is profiled so that the attenuation of the beam is substantially proportional to the displacement of the blade.

5. A device of claim 2, wherein the blade is profiled so that the attenuation of the beam is linear versus the displacement of the blade.

6. A device of claim 1, wherein the blade is profiled so that the attenuation of the beam is substantially logarithmic versus the displacement of the blade.

7. A device of claim 1, wherein the actuator is an electrostatic type actuator.

8. A device of claim 1, wherein the actuator is an electromagnetic type actuator.

9. A device of claim 1, wherein the actuator is a thermal type actuator.

10. A device of claim 1, wherein the actuator is a piezoelectric type actuator.

11. A device of claim 1, wherein the actuator is a micro-gears type actuator.

12. A device of claim 1, wherein the attenuator is a monolithic structure.

13. A device of claim 1, the device being integrated into a package.

14. A device of claim 1, wherein the light input means includes a fiber.

15. A device of claim 14, wherein the fiber is selected from the group consisting of cleaved fiber, angle cleaved fiber, expanded core fiber and fiber bundle.

16. A device of claim 1, wherein the light input means includes a lensed source.

17. A device of claim 16, wherein the lensed source is selected from the group consisting of ball lens, index graded lens, fiber with a lens and tapered fiber.

18. A device of claim 1, wherein the front edge of the blade has a protrusion.

19. A device of claim 18, wherein the size of the protrusion is up to several full width half maximum (FWHM) of the laser beam.

20. A device of claim 18, wherein the protrusion has a shape selected from the group consisting of triangular, trapezoidal, rectangular, square, oval, circular, semi-oval and semi-circular shapes.

21. A device of claim 1, wherein the front edge of the blade has a notch.

22. A device of claim 21, wherein the size of the notch is up to several full width half maximum (FWHM) of the laser beam.

23. A device of claim 21, wherein the notch has a shape selected from the group consisting from triangular, trapezoidal, rectangular, square, oval, circular, semi-oval and semi-circular shapes.

24. A device of claim 1, wherein the blade is made of an opaque material.

25. A device of claim 24, wherein the blade is made of a semiconductor material.

26. A device of claim 1, wherein the blade is made of a semi-transparent material.

27. A device of claim 26, wherein the semi-transparent material is doped glass.

28. A device of claim 1, the device being integrated into an optical fiber transmission system.

29. An optical attenuator comprising:
   a base; and
   an actuator formed thereon, the actuator carrying a blade whose front edge to be moved across a light beam to attenuate the light beam, wherein said blade including a pattern consisting one of three dimensional notch and protrusion selected such as to achieve a predetermined attenuation function by a resulting profile thereof.

30. An optical attenuator of claim 29, wherein trenches for receiving light input and light output means are formed on the base.

31. An optical attenuator of claim 29, wherein the front edge of the blade is profiled so that the attenuation of the beam is substantially proportional to the displacement of the blade.

32. An optical attenuator of claim 29, wherein the blade is profiled so that the attenuation of the beam is substantially logarithmic versus the displacement of the blade.

33. An optical attenuator of claim 29, wherein the attenuator is a monolithic structure.

34. An optical attenuator of claim 28, wherein the attenuator is integrated into a package.

35. An optical attenuator of claim 1, wherein the actuator is selected from the group consisting of an electrostatic type actuator, an electromagnetic type actuator, a thermal type actuator, a piezoelectric type actuator, and a micro-gears type actuator.

36. An optical attenuator of claim 1, wherein the light input and output means are selected from the group consisting of cleaved fiber, angle cleaved fiber, expanded core fiber, fiber bundle, ball lens, index graded lens, fiber with a lens, and tapered fiber.

37. An optical attenuator of claim 29, wherein the front edge of the blade has a protrusion.

38. An optical attenuator of claim 29, wherein the front edge of the blade has a notch.

39. An optical attenuator of claim 1, wherein the blade is made of an opaque material.

40. An optical attenuator of claim 1, wherein the blade is made of a semi-transparent material.

41. An actuator for a variable optical attenuator, the actuator carrying a blade whose front edge to be moved across a light beam to attenuate the light beam, the actuator comprises said blade including a pattern consisting one of three dimensional notch and protrusion selected such as to achieve a predetermined attenuation function by a resulting profile thereof.

42. An actuator of claim 41, wherein the blade is profiled so that the attenuation of the beam is substantially proportional to the displacement of the blade.

43. A device of claim 1, further including a thermal management system for maintaining a constant temperature of the device.

44. An array of variable optical attenuator devices of claim 1, the devices being arranged according to a predetermined pattern.

45. An array of claim 44, the array being a one-dimensional array.

46. An array of claim 44, the array being a two-dimensional array.

47. An array of variable optical attenuators of claim 29, the attenuators being arranged according to a predetermined pattern.

48. An array of claim 47, the array being a one-dimensional array.

49. An array of claim 47, the array being a two-dimensional array.

* * * * *